UNITED STATES PATENT OFFICE 2,877,274
Patented Mar. 10, 1959

2,877,274

PRODUCTION OF SODIUM METHOXIDE

Charles J. Kramis, Houston, Tex., assignor to E. I. du Pont de Nemours and Company, Wilmington, Del., a corporation of Delaware No Drawing. Application January 21, 1958
Serial No. 710,181

4 Claims. (Cl. 260—632)

This invention relates to an improved process for the preparation of alkali metal methoxide in a distillation column using only aqueous alkali metal hydroxide and gaseous methanol.

British Patent No. 698,282, shows the production of sodium methoxide from the reaction of sodium hydroxide and methanol in a batch operation. In this process, water is eliminated by heating the mixture so that the water-methanol azeotrope distills without fractionation. During distillation, dry methanol is added to replace that which is removed by distillation. Solid, essentially anhydrous caustic, must be used to obtain even moderate yields of sodium methoxide.

German application C5825/56 discloses a process for the continuous production of alkali alcoholates from alcohols and aqueous alkali hydroxides using a distillation column. But the application indicates that lower alcohols such as methanol, can be used in the process only if an auxiliary, preferably water-immiscible, liquid such as benzene, is added to the reaction mixture to permit efficient water removal.

In our process, we find unexpectedly that methanol used alone in continuous countercurrent flow to the alkali very favorably effects the reaction equilibrium driving the following reaction to the right:

$$CH_3OH + MOH \rightleftharpoons CH_3OM + H_2O$$

where M is an alkali metal. This difference makes it possible to use a continuous distillation column and to take advantage of the desirable concentration gradients set up therein in order to obtain both more rapid attainment of reaction and also maximum stripping efficiency.

The products from this improved process that is both the distillate (methanol containing 5 to 10% water) and the product (20 to 30% sodium methoxide in methanol) can be used directly in other operations without further purification. The sodium methoxide is substantially free from sodium hydroxide. If inerts are used as stripping agents, then additional facilities are required to purify both distillate and product before either can be used.

In addition, the use of inerts results in greater heat consumption and pressures above atmospheric are required for efficient conversion rates. The use of excess methanol alone as stripping agent as is employed in the present process avoids such complications.

The continuous process of this invention is more efficient than a batch process because of the more favorable concentration gradients both for reaction and purification.

The substitution of aqueous for solids caustic makes possible the use of a continuous fractionating column and permits countercurrent flow of methanol and caustic. This substitution and the resultant continuous fractionation produced very unexpected results. Thus, a threefold increase in the water to be removed results in over a fourfold improvement in methanol efficiency as a stripping agent over that obtained with solid caustic in a batch operation, which is a result just opposite to that one would normally expect.

Further indication of the unexpected change resulting from the improvement over the batch process is the fact that the improved process results in at least 75% reduction in methanol and at least a 40% reduction in the cost of caustic.

In this process, any continuous fractionating device can be used provided only that it has at least the requisite 10 to 15 theoretical plates needed for stripping the reaction. The top of the column should be maintained at a temperature from about 70° to 80° when operating at substantially atmospheric pressure. A preferred temperature for the top of the column is about 76° C. when operating at substantially atmospheric pressure. The bottom of the column should be maintained at a temperature from about 80° C. to 100° C. when operating at substantially atmospheric pressure. A preferred temperature for the bottom of the column is about 87° C. when operating at substantially atmospheric pressure.

The processes of this invention can be carried out at pressures above and below atmospheric, depending on economic consideration, apparatus limitations, and the like. When operation is at other than atmospheric pressure, the top and bottom column temperatures indicated above will, of course, have to be altered. At any particular pressure the top and bottom column temperatures used are determined by the boiling points of the respective mixtures present at the top and bottom of the column as those of ordinary skill in the art will readily appreciate.

In general, the temperature maintained in the top of the column at any particular pressure is the boiling point of the methanol and water mixture while the temperature maintained in the bottom of the column at any particular pressure is the boiling point of the methanol and alkali metal methoxide mixture.

Aqueous alkali hydroxide is introduced into the top of the fractionating device or column. The concentration of alkali hydroxide in the aqueous feed can vary within wide ranges. It is preferred to use hydroxide cations selected from group I of the periodic table. Because sodium hydroxide is relatively cheap and is available commercially as 50 weight percent solutions, this aqueous hydroxide is a preferred alkali metal hydroxide.

The selection of the particular alkali metal hydroxide will be influenced by the maximum solution concentration available at the least cost because such concentration should result in the lowest alkali metal methoxide. For economic reasons, one might prefer to use aqueous alkali metal hydroxide solutions containing at least 10 weight percent of caustic.

Note that this invention is not restricted to any specific water content in the hydroxide feed since methanol feed and boil-up rate will be altered as required to remove all the water.

This is a matter of the economics of the particular situation since cost of caustic and cost of methanol dehydration will vary widely. Subsequent methanol dehydration of methanol will not even be required if the 5% water content is not objectionable.

The quantity of alkali metal methoxide produced from given starting materials is dependent upon the purity of methanol. Since any water will convert methoxide to caustic, use of completely anhydrous methanol will result in 100 weight percent yield on caustic. If 0.1% water is in the methanol, the yield drops to about 90 to 95%. Thus, for economic reasons the methanol used should contain not more than 0.3 weight percent water because methoxide yields diminish rapidly as $CH_3OH$ water content rises. From a technical standpoint, substantially completely anhydrous methanol should be used. In general, the economics of any particular situation will determine the maximum caustic concentration.

Methanol is introduced into the bottom of the fractionating device or column. Only about 2 to 3% of the methanol feed is converted to methoxide. About 15 to 20% of the methanol is removed with the methoxide to maintain the product in solution. The remainder of the methanol is withdrawn overhead and contains approximately 5% water.

The quantity of methanol required will obviously vary with water content of caustic (alkali metal hydroxide aqueous solution). About 20 pounds of methanol are required for each pound water introduced with the caustic. In addition, four to five pounds of methanol are required to remove water of reaction for each pound of sodium methoxide formed. For instance, about 20 to 25 pounds methanol are added per pound of 100% sodium methoxide when using 50 weight percent of caustic. About 12 to 14 pounds of methanol are required to remove the water introduced with 50 percent caustic. The remainder of the methanol is used in the reaction and carried out in the product to maintain it in liquid phase.

In addition to the foregoing examples, the process of the invention is further illustrated by the following example:

Example I

Sodium methoxide is prepared using a continuous countercurrent distillation column operating at atmospheric pressure as follows:

The following apparatus is used:

The column is constructed using a mild steel pipe 30 feet tall and 8 inches wide, 20 feet of which is filled with 1-inch steel ring packing. Only the bottom 8 feet and top 7 feet of the column are insulated.

The column is heated by means of a natural recirculation shell and tube calandria. This calandria is fitted with 10 1-inch by 8-foot tubes which gives it the equivalent of 20 square feet of heat transfer surface area. The heating media is steam which is fed into the top of the calandria shell at a pressure of about 150 p. s. i. g. The reactants are taken off from the bottom of the column, and the sodium methoxide is drawn off as will be described below. The methanol drawn off from the bottom of the column circulates upwards through the calandria tubes, and after leaving the calandria is returned as a vapor to the column just below the column packing and above the bottom draw-off. A space is left open in the column below the vapor inlet and above the bottom draw-off to act as a liquid separator.

The methanol is fed by a pump to the circulating column bottoms just before they enter the calandria. The pump has an adjustable stroke and a capacity of 7 to 70 G. P. H.

Caustic is fed to the top section of the column through a pump having an adjustable stroke and a capacity of 0.5 to 5 G. P. H.

Methanol vapor contaminated with water vapor is drawn off from the top of the column and condensed in a water-cooled shell and tube condenser. This condenser is fitted with 10 1-inch by 8-foot tubes equivalent to 20 square feet of heat transfer area.

Sodium methoxide in methanol is drawn off from the bottom of the column and passed through a water-cooled product cooler and collected in a hold tank. This product cooler has 8 feet of jacketed 1-inch pipe giving it an equivalent heat transfer area of 2 square feet. The hold tank has a 250 gallon capacity.

Reactants and reaction conditions:

Into this column, which serves as a combination reactor and stripper, is fed 19.6 lbs./hr. of 50 weight percent NaOH solution. To the bottom of the calandria is added 310 lbs./hr. of substantially anhydrous methanol.

About 128 lbs./hr. of steam is required to supply the heat required to strip out both the water of reaction plus the water in with the caustic. The top of the column is maintained at a temperature of about 76±2° C. and the bottom of the column is maintained at a temperature of about 87±4° C.

From the column bottom is withdrawn about 13.2 lbs./hr. of sodium methoxide as approximately a 22.5 weight percent solution in methanol. About 13.2 lbs./hr. of water is removed in the distillate (no reflux) as a 5.5 weight percent solution in methanol.

The claims are:

1. An improved process for the continuous preparation of alkali metal methoxide in a distillation column operated at substantially atmospheric pressure using only aqueous alkali metal hydroxide and gaseous methanol comprising passing the aqueous alkali metal hydroxide downwardly countercurrently to methanol passing upwardly through a distillation column having at least 10 theoretical plates while maintaining the temperature in the top of the column at the boiling point of the methanol and water mixture and the temperature in the bottom of the column at the boiling point of the methanol and alkali metal methoxide mixture.

2. The process of claim 1 wherein the distillation column is operated at substantially atmospheric pressure while maintaining the temperatures in the top of the column in the range of about 70–80° C. and in the bottom of the column in the range of about 80–100° C., respectively.

3. The process of claim 1 wherein the alkali metal hydroxide is sodium hydroxide.

4. The process of claim 1 wherein the methanol is substantially anhydrous.

References Cited in the file of this patent
UNITED STATES PATENTS

| | | |
|---|---|---|
| 1,816,843 | Halbig et al. | Aug. 4, 1931 |
| 1,910,331 | Halbig | May 23, 1933 |

FOREIGN PATENTS

| | | |
|---|---|---|
| 304,585 | Great Britain | June 20, 1929 |
| 625,453 | Great Britain | June 28, 1949 |
| 698,282 | Great Britain | Oct. 14, 1953 |